United States Patent Office 3,338,276
Patented Aug. 29, 1967

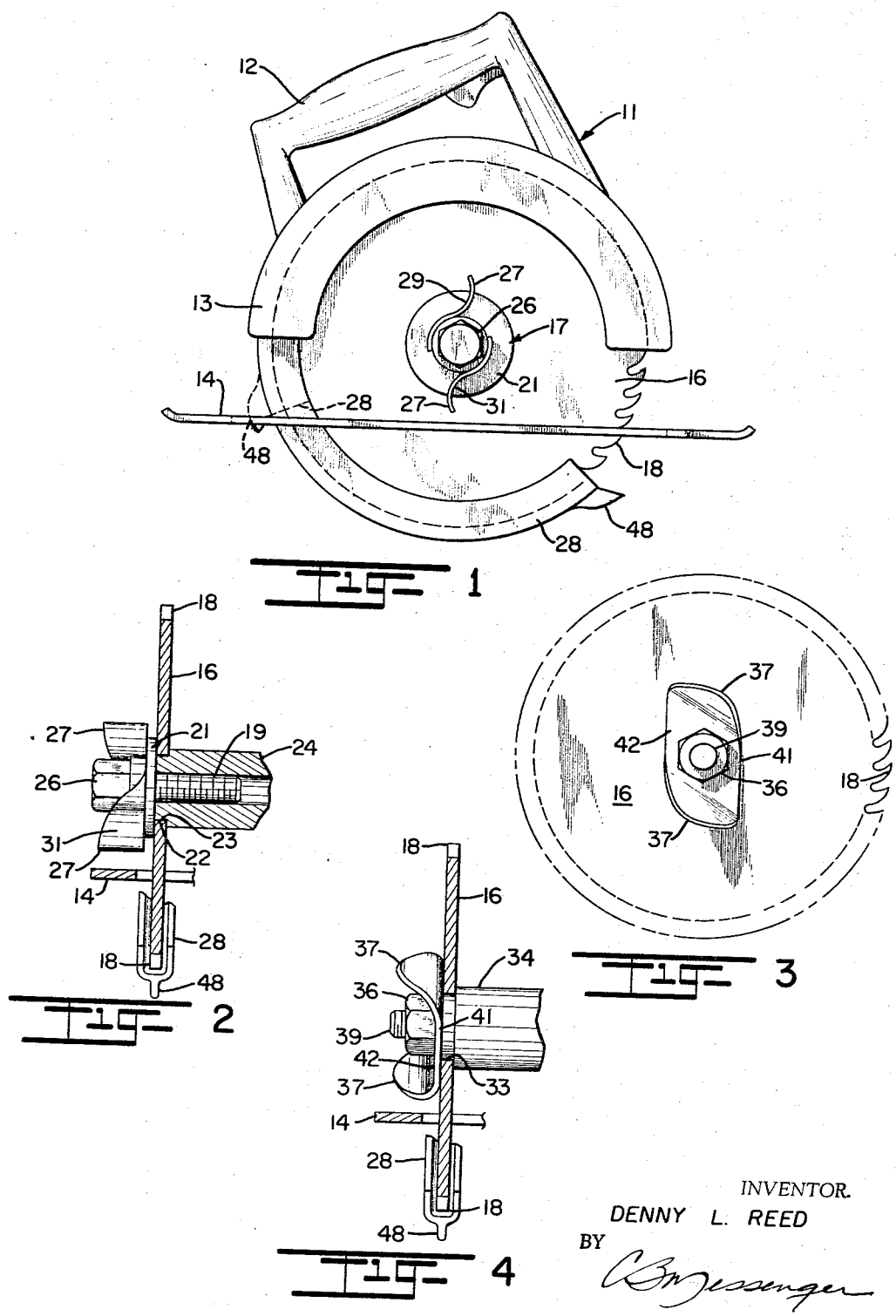

3,338,276
GUIDE ATTACHMENTS FOR POWER SAWS
Denny L. Reed, 2127 S. Pennsylvania St.,
Denver, Colo. 80210
Filed Mar. 25, 1965, Ser. No. 442,730
7 Claims. (Cl. 143—155)

The present invention relates to improvements in hand power saws and, more particularly, to attachments therefor. The particular attachments of interest are provided so that straight cuts may be more easily made.

In accomplishment of such desirable result, certain specific objectives have been considered. Among such objects is the provision of an arbor attachment that is so formed that it will fan or blow accumulated sawdust away from the saw blade and any cutting guideline used by the workman.

Another object of the invention is to provide a guide tip on a guard element of such hand saws that is positioned so that the tip will be received in the kerf cut by the saw to prevent inadvertent departure from a straight line cut.

Another object of the invention is to provide an arbor lock piece which incorporates wings or vanes that are beneficially positioned so that such vanes, which are primarily useful to blow sawdust away from the blade and cutting line, may be conveniently engaged by the fingers when it is desired to secure the saw on the arbor.

A further object is to provide a washer or spacer having desirably formed vanes that can be applied to the arbor of saws to blow sawdust away from the saw blade.

Further objects and advantages of the present invention will be apparent from the appended description and drawings, in which FIG. 1 is a side elevation with parts shown in alternate position, FIG. 2 is a partial cross-sectional elevation taken along a vertical center line through the saw blade and guard, FIG. 3 is a side elevation showing construction features of an alternate washer or spacer arbor lock piece configuration, and FIG. 4 is a cross-sectional elevation taken along the center line of the configuration shown in FIG. 3.

Briefly stated, the present invention is directed to means for improving the utility of hand power saws. The invention is primarily concerned with attachments that will facilitate the making of straighter or better regulated cuts. A first attachment is concerned with the provision of vanes that are cooperatively disposed on selected arbor lock piece elements so that the vanes will direct air downwardly against the material being cut so that sawdust collected thereon will be blown away from the blade and from any previously drawn cutting line. The vanes used in a first embodiment are of a distinctive configuration so that a secondary purpose is served, inasmuch as the vanes may be engaged by a user's fingers when the arbor lock piece elements are being tightened in place. A second principle of the invention provides a guide vane or tip that is disposed on the saw guard so that such tip will be received in the kerf cut by the saw to prevent sideways movements of the rear elements of the saw as a continuing straight cut is being completed.

The detailed features of an arbor bolt type of construction which incorporates the desirable air vanes are shown in FIGURES 1 and 2. Here a hand power saw 11 having an operator handle 12, frame components 13 and a supporting guide base 14 is provided with a saw blade 16 which rotates with the drive elements of the saw when an arbor bolt assembly 17 is tightened into the arbor 24 and drive elements of the saw. As indicated by the positioning of the saw teeth 18, this saw is intended to run in a counter-clockwise direction, and, accordingly, the threaded bolt segment 19 of the arbor bolt assembly 17 may be provided with a right hand thread.

This bolt segment 19, as illustrated in FIGURE 2, may be provided with an integral base disk segment 21 which is brought into contact with the outer face of the saw blade 16 as the bolt is tightened so that the center cutout 22 of the saw blade 16 comes into mating engagement with a shoulder 23 on the arbor 24 of the saw. The outer or exposed end of the bolt 19 is provided with a hex-head 26. The structure for this arbor bolt assembly 17 as here described is in most respects similar or identical with similar constructions now used on many different makes and models of power saws. In some instances, however, the disk 21 component and function is served by a washer or similar spacer member that is separate from an arbor bolt component.

As an improvement over present arbor bolts and fasteners, the present invention provides a plurality of air vanes which are supported above the disk 21 and about the hex-head 26. These air vanes 27 are preferably of curved shape and are preferably bent toward the direction of rotary movement so that the vanes in effect entrap or cup surrounding air. As the saw blade and arbor rotate at an operative speed, these vanes 27 will direct a blast of air outwardly away from a central arbor for the saw. A portion of this air blast is necessarily directed down against the material being cut, and, accordingly, any accumulated sawdust is blown away from the side of the blade 16 and also away from any guideline that has been drawn on the material being cut. Operation of a saw including this type of directed air vanes has shown that the guideline is kept unobstructed by any loose sawdust. The operator is able to see the guideline at all times, and the cutting of straight lines is, therefore, facilitated.

The air blast actually is directed to all radial positions, and, accordingly, it has been noted that sawdust is also kept away from the motor and other operative parts of the saw. The frame segment 13 which encloses the upper part of the saw is kept clean as well as the rotating saw guard 28, which is shown in FIGURE 1 in its released guard position and also alternately in its retracted operative position.

The particular vane configuration illustrated in FIGURE 1 is of special added advantage, since the vanes provide convenient finger holds when it is desired to tighten the arbor lock piece or bolt on the saw. The thumb may be placed against the cupped inner surface 29 of one guide vane 27, while the forefinger is placed in a corresponding surface 31 of the other guide vane. For most saws the arbor bolt can be tightened sufficiently with the finger pressure that may be exerted against these vanes to prevent any inadvertent loosening of the arbor bolt. If the threads are worn or if a tighter assembly is required, a wrench may be applied to the hex-head 26 which extends outwardly past the limits of the guide vanes 27.

Inasmuch as this attachment is intended for use on existing saws as well as for incorporation as original equipment on new saws, a first modification is of importance. Under such modification the structure of the arbor bolt assembly 17 may be provided in component segments. The bolt inclusive of the threads 19 and the hex-head 26 can be provided separately from the base support 21 and the guide vanes 27. Accordingly, it is contemplated that a base and guide vane assembly may be provided for replacement use on existing saws. Similarly, it should be understood that the guide vanes themselves can be provided separate and apart from the bolt 19 or the base 21. It is believed that al such modifications are adequately suggested by the showings in FIGURES 1 and 2 when coupled with the present description.

One such embodiment of the invention is shown in FIGURES 3 and 4 where a separate arbor lock piece in the form of a washer-guide vane structure 41 is provided for use on saws in which the drive arbor of the saw extends through the saw blade.

In this type of saw construction the drive arbor 34 is provided with a shoulder 33, and a stud 39 extends outwardly from the shoulder. The saw blade 16 is received on the arbor 34 and is held against the arbor 34 when a nut 36 is tightened on the stud 39. By placing a washer-guide vane 41 of the type illustrated in FIGURES 3 and 4 between the saw blade and nut, the desirable sawdust moving air blast may be obtained. Guide vanes 37 raised above the flat intermediate base portion 42 will again serve to entrap and blow air radially outwardly from the saw arbor. If properly constructed and sized, the washer-guide vane 41 illustrated in FIGURES 3 and 4 may be applied to most existing hand saw configurations whether such saws are held on a stud extending out of the arbor by use of a nut or where arbor bolts are used that will be passed through the control opening of the washer-guide vane structure 41.

A further attachment for hand saws which will materially aid in the making of straight cuts is shown in FIGURES 1, 2 and 4. In these figures it should be noted that the guard 28 is provided with an outwardly extending vane 48 on its forward end. When the saw is being used to cut a sheet of material, the guard 28 will be moved to its retracted position as shown in FIGURE 1. When the guard itself is in retracted position, the vane 48 will still extend downwardly into the kerf that has been cut by the saw. This engagement between the vane 48 and the kerf tends to hold the saw in a straight ahead orientation, and, accordingly, straighter saw cuts can be made through use of such attachment.

While separate embodiments of the invention have been shown and described, it should be obvious that the invention is adaptable to various modifications and changes. All such modifications which come within the scope of the following claims are considered to be a part of this invention.

I claim:

1. An arbor lock piece attachment for power driven vircular saws comprising a support structure having a surface adapted for engagement toward a face of the saw blade, air vanes on said structure disposed axially away from said blade, said vanes having a surface of concave curvature disposed forwardly in the direction of saw blade rotation for directing a current of air radially outwardly from the arbor of said saw.

2. An arbor lock piece attachment for power driven circular saws comprising a support structure having a surface adapted for engagement toward a face of the saw blade, air vanes on said structure disposed axially away from said blade, said vanes having a surface of concave curvature disposed forwardly in the direction of saw blade rotation for directing a current of air radially outwardly from the arbor of said saw, said curved air vane surface being further useful as finger engagement surfaces when said arbor lock piece attachment is being tightened on said saw.

3. An arbor lock piece attachment for power driven circular saws comprising a support structure having a surface adapted for engagement toward a face of the saw blade, threads on said structure for holding said structure in engagement with the arbor of said saw, air vanes on said structure disposed axially away from said blade, said vanes having a surface of concave curvature disposed forwardly in the direction of saw blade rotation for directing a current of air radially outwardly from the arbor of said saw, said curved air vane surface being further useful as finger engagement surfaces when said arbor lock piece attachment is being threadedly engaged on said saw.

4. An arbor lock piece attachment for power driven circular saws comprising a base disk having one side adapted for engagement toward a face of the saw blade with the other side disposed outwardly therefrom, air vanes for said base disk likewise disposed outwardly from said blade, said vanes having a plane surface disposed perpendicularly to said base disk and saw blade for directing a current of air radially outwardly from the arbor of said saw, said air vane plane surface being further useful as finger engagement surfaces when said arbor lock piece attachment is being tightened on said saw.

5. An arbor lock piece attachment for power driven circular saws comprising a base disk having one side adapted for engagement toward a face of the saw blade with the other side disposed outwardly therefrom, diametrically opposed air vanes for said base disk likewise disposed outwardly from said blade, said vanes having a curved plane surface disposed perpendicularly to said base disk and saw blade for directing a current of air radially outwardly from the arbor of said saw, said air vane plane surface being further useful as finger engagement surfaces when said arbor lock piece attachment is being tightened on said saw.

6. An arbor lock piece attachment for power driven circular saws comprising a centrally apertured base disk having one side adapted for engagement toward a face of the saw blade with the other side disposed outwardly therefrom, air vanes for said base disk likewise disposed outwardly from said blade, said vanes having a plane surface disposed perpendicularly to said base disk and saw blade for directing a current of air radially outwardly from the arbor of said saw.

7. An arbor lock piece attachment for power driven circular saws comprising a base disk having one side adapted for engagement toward a face of the saw blade with the other face disposed outwardly therefrom, air vanes for said base disk likewise disposed outwardly from said blade, said vanes having a curved plane surface disposed perpendicular to said base disk and saw blade for directing a current of air radially outwardly from the arbor of said saw, and a bolt member having threads thereon disposed centrally of said disk for holding said attachment in engagement with the arbor of said saw, said air vane surfaces being further useful as finger engagement surfaces when said arbor lock piece attachment is being threadedly engaged to the arbor of said saw.

No references cited.

DONALD R. SCHRAN, *Primary Examiner.*